Sept. 19, 1939.   J. I. ENGLAND   2,173,778
CUTTING TOOL
Filed June 13, 1936
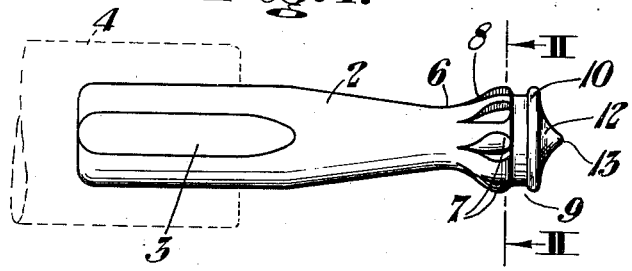
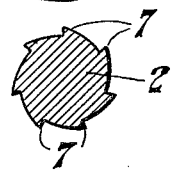
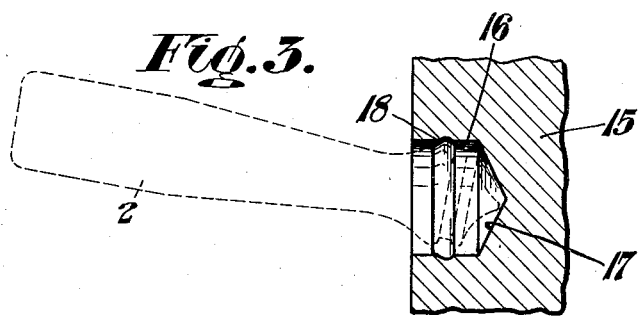
Inventor:
JOSEPH I. ENGLAND,
by Usina & Rauber
his Attorneys.

Patented Sept. 19, 1939

2,173,778

UNITED STATES PATENT OFFICE 2,173,778

CUTTING TOOL

Joseph I. England, Worcester, Mass., assignor to The American Steel and Wire Company of New Jersey, a corporation of New Jersey Application June 13, 1936, Serial No. 85,184

1 Claim. (Cl. 77—58)

This invention relates to cutting tools and more particularly those which are adapted to cut an annular groove in the wall of a pre-formed recess.

In many arts it is desirable to form an annular groove in the side-wall of a recess, the groove being spaced intermediate the bottom and exterior thereof. As an example, it is current practice in the art of rail bonds to drill a recess in the head of a rail, and subsequently insert a stud therein, the stud being expanded to snugly occupy the same by any convenient method. Obviously, a better connection between such a stud and the side-wall of the recess will be formed if said wall is recessed and the stud made to fill the same.

It is among the objects of the present invention to provide a novel cutting tool which will efficiently operate to form an annular groove in the side wall of a recess, and more particularly those recesses whose diameters are greater in proportion to the depth thereof; which have heretofore been difficult to treat in this matter.

Another object is to provide a device of the class described which is inexpensive to manufacture, easy to use by unskilled workmen, and one which will withstand hard usage for a long period of time.

Another object is to provide a cutting tool of the class described which will operate on very hard materials, such as heat-treated steel, in addition to copper, wood, fibre, and other suitable materials.

The foregoing and other objects will be apparent after referring to the drawing in which:

Figure 1 is a side elevation of the device of the invention.

Figure 2 is a sectional view on the lines II—II of Figure 1.

Figure 3 is a sectional view of a recess illustrating the manner in which the device of the invention performs.

Referring more particularly to the drawing, the numeral 2 designates the shank of the tool of the invention. This shank is provided adjacent one of its ends with a number of flattened surfaces 3 for enabling rigid engagement; whereby it may be conveniently rotated.

The device 4 which rotates the shank 2 forms no part of the present invention, but should be capable of producing a "wobble" effect: of which there are many types on the market at the present time.

The other end of the shank 2 is outwardly flared, as shown at 6 and provided with a number of cutting teeth 7. These cutting teeth 7 are of tapering depth as shown at 8; the taper running inwardly toward the other end of the shank 2. Immediately adjacent the deepest portion of the teeth 7, the tool is cylindrically under-cut as showed at 9.

At the other end of this cylindrically undercut portion 9 there is carried an annular flange 10 whose diameter is substantially the same as the over-all diameter of the cutting teeth 7. The extremity of the cutting end of the device of the invention tapers off from the annular flange 10 in the form of a cone 12, the apex of which, as shown at 13, regulates the depth at which the cutting teeth 7 perform with respect to the bottom of the recess.

Referring to Figure 3 of the drawing, the numeral 15 designates an object having a cylindrical recess 16 the bottom of which is conical, as shown at 17. Initially, the wall of the recess 16 is entirely cylindrical, the purpose of the device of the invention being to form an annular groove 18 therein. This effect is accomplished by the teeth 7 and the annular flange 10, which serves as a pilot for the former. The cutting teeth 7, are spaced from the bottom of the recess 16 by the apex 13 of the cone 12 on the cutting end of the shank 2. The annular flange, or pilot 10, prevents the cutting teeth 7 from making a cut until the teeth are in proper relationship with respect to the side wall of the recess 16. Due to the spacing and backing-up of the teeth 7, chips of the material are permitted to fall therethrough.

During the cutting operation, one of the teeth 7 acts as a leader, the next one carries the brunt of the work, and the third one acts as a follow-up. Thus, the cutting teeth 7 function in series of three; and the life of the tool is enhanced.

While I have shown and described one specific embodiment of my invention, it will be understood that I do not wish to be limited exactly thereto, as various modifications may be made without departing from the scope of my invention, as defined by the appended claim.

I claim:

A cutting tool comprising a shank carrying an operating head, said shank having a portion of reduced diameter adjacent to and connecting with said operating head; said operating head embodying a tapering extremity, a plurality of radially extending peripheral cutting teeth, and a disc-shaped pilot disposed between the tapering extremity of said operating head and radially extending peripheral cutting teeth, said cutting tool having an undercut portion between said disc-shaped pilot and said radially extending peripheral cutting teeth.

JOSEPH I. ENGLAND.